United States Patent
Arafat et al.

(10) Patent No.: US 12,308,779 B2
(45) Date of Patent: May 20, 2025

(54) TORQUE RIPPLE COMPENSATION IN A MOTOR CONTROL SYSTEM

(71) Applicant: Cummins Inc., Columbus, IN (US)

(72) Inventors: Akm Arafat, Blaine, MN (US); Bradford K. O. Palmer, Ham Lake, MN (US); S. Dakshina Murthy-Bellur, Plymouth, MN (US); Minyu Cai, Roseville, MN (US)

(73) Assignee: Cummins Inc., Columbus, IN (US)

( * ) Notice: Subject to any disclaimer, the term of this patent is extended or adjusted under 35 U.S.C. 154(b) by 231 days.

(21) Appl. No.: 17/916,390

(22) PCT Filed: Apr. 1, 2020

(86) PCT No.: PCT/US2020/026105
§ 371 (c)(1),
(2) Date: Sep. 30, 2022

(87) PCT Pub. No.: WO2021/201856
PCT Pub. Date: Oct. 7, 2021

(65) Prior Publication Data
US 2023/0145167 A1    May 11, 2023

(51) Int. Cl.
*H02P 6/10* (2006.01)
*H02P 29/50* (2016.01)

(52) U.S. Cl.
CPC ............... *H02P 6/10* (2013.01); *H02P 29/50* (2016.02)

(58) Field of Classification Search
CPC .................................. H02P 6/10; H02P 29/50
USPC ..................................................... 318/400.23
See application file for complete search history.

(56) References Cited

U.S. PATENT DOCUMENTS

| | | | |
|---|---|---|---|
| 5,962,999 A | 10/1999 | Nakamura et al. | |
| 7,768,220 B2 * | 8/2010 | Schulz | H02P 29/50 318/443 |
| 7,952,308 B2 | 5/2011 | Schulz et al. | |
| 8,410,735 B2 | 4/2013 | Tobari et al. | |
| 8,786,223 B2 | 7/2014 | Leonardi et al. | |

(Continued)

FOREIGN PATENT DOCUMENTS

| | | | |
|---|---|---|---|
| CN | 104579080 A | | 4/2015 |
| CN | 108390533 A | * | 8/2018 |

OTHER PUBLICATIONS

International Search Report and Written Opinion for International patent application No. PCT/US2020/026105, filed Apr. 1, 2020, mailed Jul. 9, 2020.

(Continued)

*Primary Examiner* — Kawing Chan
(74) *Attorney, Agent, or Firm* — Faegre Drinker Biddle & Reath LLP

(57) ABSTRACT

A method for operating a motor control system to dynamically compensate for low-frequency and/or high-frequency torque ripple. Embodiments include receiving an input command, receiving drive feedback signals representative of drive currents in a motor, identifying harmonics in the drive feedback signals representative of motor torque ripple, producing torque ripple compensation signals based on the identified harmonics; and producing motor drive control signals based on the input command, the current feedback signals, the torque ripple compensation signals, and carrier signals with a certain phase shift.

16 Claims, 2 Drawing Sheets

(56) References Cited

U.S. PATENT DOCUMENTS

| | | | |
|---|---|---|---|
| 8,981,692 B2 | 3/2015 | Simili | |
| 9,136,785 B2 | 9/2015 | Gebregergis et al. | |
| 9,143,081 B2 | 9/2015 | Gebregergis et al. | |
| 2004/0169482 A1* | 9/2004 | Maeda | H02P 6/28 318/443 |
| 2006/0132082 A1 | 6/2006 | Ihm | |
| 2009/0267555 A1* | 10/2009 | Schulz | H02P 29/50 318/432 |
| 2012/0268052 A1* | 10/2012 | Nam | H02P 6/182 318/494 |
| 2016/0315566 A1* | 10/2016 | Vuletic | B60K 6/00 |

OTHER PUBLICATIONS

Bolognani et al. "Flux-Weakening in IPM Motor Drives: Comparison of State-of-Art Algorithms and a Novel Proposal for Controller Design", Jan. 2011, http://www.dieunipd.it; 12 pages.

Lim, Steven, "Sensorless-FOC with Flux-Weakening and MTPA for IPMSM Motor Drive", Apr. 2018, Texas Instruments, 17 pages.

Lyra, Renato O.C. et al. "Torque Density Improvement in a Six-Phase Induction Motor with Third Harmonic Current 4 Injection", IEEE Transactions on Industry Applications, vol. 38, No. 5, Sep./Oct. 2002, 10 pages.

Supplementary European Search Report and Written Opinion for EP 20929066, completed Oct. 24, 2023.

* cited by examiner

TORQUE RIPPLE COMPENSATION IN A MOTOR CONTROL SYSTEM

CROSS-REFERENCE TO RELATED APPLICATIONS

The present application claims the benefit of International Patent Application No. PCT/US2020/026105, filed Apr. 1, 2020, the entire disclosure of which is hereby incorporation by reference in its entirety.

FIELD OF THE DISCLOSURE

This disclosure relates generally to electric motor control systems. More specifically, the disclosure relates to alternating current (AC) motor control systems providing harmonic torque ripple compensation.

BACKGROUND OF THE DISCLOSURE

Alternating current (AC) motor systems are used in a wide variety of applications including industrial settings and motor vehicles Systems of these types include an AC motor and a motor control system. In response to an input command, the motor control system applies power from an energy source to the motor in a controlled manner, and causes the motor to provide the commanded output. For example, in response to a torque command, the motor control system will cause the motor to deliver the requested torque at the motor output shaft. Although AC motor control systems typically attempt to provide balanced sinusoidal drive currents to produce constant torque outputs from the motors, undesirable variations in the motor torque output, commonly known as torque ripple, are inherent in many AC motors. For example, torque ripple is an inherent characteristic of many AC motors, such as interior permanent magnet machines, due to the placement of magnets at discrete locations about the rotational axes of the motors. There remains a continuing need for improved AC motor control systems that can reduce torque ripple.

SUMMARY

Disclosed embodiments include an improved method for operating a motor control system to compensate for torque ripple. Embodiments include receiving an input command, receiving drive feedback signals representative of drive currents in a motor, identifying harmonics in the drive feedback signals representative of motor torque ripple, producing torque ripple compensation signals based on the identified harmonics, and producing motor drive control signals based on the input command, the current feedback signals and the torque ripple compensation signals.

In examples, identifying the harmonics in the drive feedback signals includes identifying harmonics of the drive currents, producing the torque ripple compensation signals includes producing harmonic cancellation commands, and producing, the motor drive control signals includes summing the harmonic cancellation commands and the input command. Summing the harmonic cancellation commands and the input command may include summing the harmonic cancellation commands and the input command in the d-q reference frame.

In these and other examples, the method further comprises producing d-q reference frame control feedback signals based on the drive feedback signals, and producing the motor drive control signals includes producing the motor drive signals based on the summed harmonic cancellation commands and the input command in the d-q reference frame and based on the d-q reference frame control feedback signals.

Examples of the method are configured for use with a motor having multiple sets of windings. Producing the torque ripple compensation signals may include determining a phase shift angle for a set of carrier signals, and producing the motor drive control signals may include producing a set of motor drive control signals for each of the multiple sets of windings based on one of the carrier signals, and controlling the relative phase of the set of carrier signals based on the phase shift angle.

In examples, producing the torque ripple compensation signals further includes determining carrier signal phase shift angle, and producing the motor drive control signals further includes producing the motor drive control signals based on the carrier signals with a certain phase shift angle.

In, examples, producing the torque ripple compensation signals includes producing the torque ripple compensation signals based on magnitudes of the identified harmonics. Producing the torque ripple compensation signals may include producing the signals if the magnitudes of the identified harmonics are greater than predetermined levels.

The method may be configured for control of a multiple phase motor. The method may be configured for control of a motor having multiple sets of windings. In examples, the method further comprises receiving motor operating characteristic feedback signals, and producing the motor drive control signals further includes producing the motor drive control signals based on the motor operating characteristic feedback signals. The input command includes a torque command in examples.

DETAILED DESCRIPTION

Figure 1:
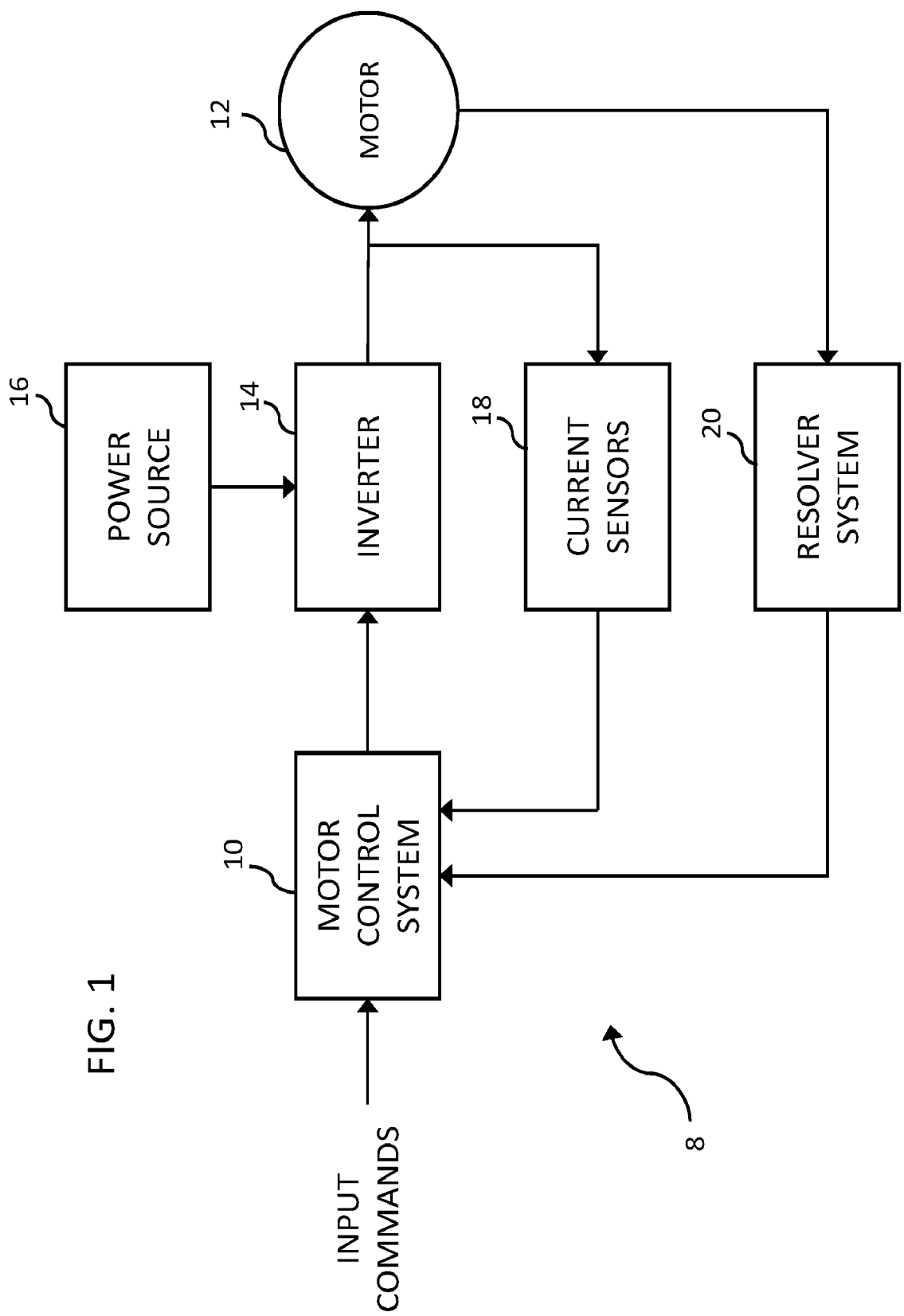
FIG. 1 is a diagrammatic illustration of a motor system including a motor control system in accordance with embodiments.

FIG. 1 is a diagrammatic illustration of a motor system 8 including a motor control system 10 and an alternating current (AC) motor 12 in accordance with embodiments. Outputs of the motor control system 10 are coupled to an inverter 14. Inverter 14 is responsive to the outputs of the motor control system 10, and controls the application of power from a source 16 to the motor 12. In addition to control input commands such as a torque request, motor control system 10 receives feedback inputs from components of the system 8. In the illustrated embodiments, for example, motor control system 10 is coupled to receive feedback inputs representative of electrical operating characteristics of the motor 12 provided by current sensors 18, and mechanical operating characteristics of the motor provided by resolver system 20. As described in greater detail below, in response to the control input commands and the system feedback inputs, motor control system 10 provides output drive signals or commands that cause the motor to provide the commanded outputs such as torque levels, while compensating for variations in output torque, known as torque ripple, caused by inherent characteristics of the motor 12.

In embodiments, motor 12 is a multi-phase AC electric machine having a rotor and stator windings. For example, motor 12 may be an interior permanent magnet (IPM) motor, an induction motor, or a synchronous motor. Although a six-phase motor 12 is described below as an exemplary embodiment, embodiments also include fewer (e.g., three-) or more (e.g., nine) phase machines. Power source can include a battery, fuel cell, conventional power grid or any other energy source suitable for the motor 12 and its application, and is a direct current (DC) source in embodiments.

Motor 12 operates in response to voltage drive signals applied by the inverter 14. In embodiments such as those described below comprising a six-phase motor 12, motor control system 10 provides voltage drive commands $V_A$, $V_B$, $V_C$, $V_D$, $V_E$, $V_F$ (i.e., $V_{A-F}$) to the inverter 14. The voltage drive commands may be pulse-width modulated (PWM) signals. Inverter 14 processes the voltage drive commands and applies the commanded voltages to the windings of the motor 12. The applied voltages create torque-producing current in the windings of the motor 12 that results in rotation of the motor shaft. Inverter 14 can be of any known or otherwise conventional design. Such inverters 14 commonly include a plurality of power switches to provide the PWM drive signals.

Each of the voltage drive commands $V_{A-F}$ corresponds to one of the phase windings of the motor 12. Accordingly, the six-phase motor 12 embodiments described herein have six voltage drive commands $V_{A-F}$. In embodiments, the six-phase motor 12 may be configured to include two sets of three-phase windings (e.g., a first set of windings and a second set of windings). For purposes of convention and example, three of the voltage drive commands such as $V_{A-C}$ may be associated with and applied to the three windings of the first set of windings, and three of the voltage drive commands such as $V_{D-F}$ can be applied to the three windings of the second set of windings.

Motor control system 10 may comprise a processor, a controller, a digital logic circuit and/or a computer. The control system 10 may comprise or be coupled to memory (volatile memory such as RAM, and non-volatile memory such as magnetic memory, ROM and EEPROM), a communication interface (e.g., a wired serial or parallel data bus), an input (such switches, keypad or communication interface) and an output such as a display. The memory may store software such as instructions representative of algorithms or steps of the methods described herein that are executed by a processor, controller, digital logic circuit and/or computer. The communication interface may comprise a communication module for sending and receiving messages and signals (e.g., input commands) over a network. The communication module may be capable of communication over one or more wireless or wired technologies (e.g., WiFi, Bluetooth, cellular networks, local area networks (LANs) and/or wide area networks (WANS)).

Current sensors 18 are coupled to the motor 12 and provide signals representative of the current (I) on each of the windings of the motor. In embodiments such as those described below comprising a six-phase motor 12, current sensors 18 provide feedback signals $I_A$, $I_B$, $I_C$, $I_D$, $I_E$, $I_F$ (i.e., $I_{A-F}$) representative of the currents on each of the windings. Current sensors 18 can be any known or otherwise conventional devices. In embodiments, current sensors 18 provide information representative of the magnitude or levels of the currents on the windings of motor 12. With the current level information provided by current sensors 18, motor control system 10 can derive information regarding the relative phases of the signals $I_{A-F}$, which will be representative of the phases of the currents in the windings of the motor 12. In other embodiments, the current sensors 18 directly provide information regarding the phases of the motor winding currents. Yet other embodiments of the motor system 8 include sensors that provide additional or alternative information representative of electrical operating characteristics of the motor 12.

Resolver system 20 may include one or more sensors. In embodiments, resolver system 20 includes an encoder or other position sensor that provides information on the rotational or angular position (θ) of the shaft of motor 12. Resolver system 20 provides angular position feedback signals θ in embodiments. With the shaft position information provided by the resolver system 20, motor control system 10 can derive information regarding the rotational or angular velocity (ω) of the shaft of motor 12. In other embodiments, the resolver system 20 directly provides information regarding the angular velocity of the shaft of motor 12. Yet other embodiments of resolver system 20 provide information representative of alternative or additional operating parameters of the motor 12.

In embodiments, motor control system 10 is configured to receive a control input command specifying a desired amount of torque to be produced by motor 12. Motor control system 10 may also receive the current feedback signals $I_{A-F}$ from current sensors 18 and the shaft angular position feedback signals θ from resolver system 20. Motor control system 10 processes the torque control input command and feedback signals such as the current feedback signals $I_{A-F}$ and the angular position feedback signals θ to produce the voltage drive signals that are applied to the inverter 14. In embodiments such as those described below comprising a six-phase motor 12, motor control system 10 produces voltage drive signals $V_A$, $V_B$, $V_C$, $V_D$, $V_E$, $V_F$ (i.e., $V_{A-F}$), each of which is associated with one of the windings of the motor. Motor control system 10 produces the voltage drive signals $V_{A-F}$ based on a control algorithm. In embodiments, motor control system 10 implements a flux-weakening (FW) and maximum-torque-per-ampere (MTPA) control algorithms to produce the voltage drive signals as a function of the input command and feedback signals. FW and MTPA algorithms are generally known, and any such conventional or otherwise known algorithm suitable for the application of the system 8 and/or motor 12 can be used.

The control algorithm implemented by motor control system 10 also includes torque ripple compensation components to reduce torque ripple of the motor 12. Motor control system 10 provides dynamic and instantaneous torque ripple compensation by providing the compensation based on then-existing electrical or other operating characteristics of the motor 12 contributing to the torque ripple. As described in greater detail below, the current feedback signals $I_{A-F}$ are analyzed by the motor control system 10 to identify parameters of the currents on the windings of the motor 12 that are contributing to torque ripple. Motor control system 10 then produces the voltage drive signals in a manner that minimizes or reduces the torque ripple. In embodiments, the torque ripple compensation component of the control algorithm identifies parameters associated with both low-frequency torque ripple and high-frequency torque ripple.

The low-frequency torque ripple is at harmonics of the fundamental-frequency of the currents in the windings of the motor 12 (e.g., harmonics of the fundamental frequency of voltage drive commands $V_{A-F}$). To cancel or reduce the low-frequency torque ripple, the low-frequency dominant harmonics are identified, and the voltage drive signals $V_{A-F}$ are produced in a manner that controls the currents in the windings to reduce those harmonics. The high-frequency torque ripple is at harmonics of the switching frequency and can be reduced in a multi-phase machine. Embodiments, for example, include a six-phase motor 12 including two sets of three-phase windings. Similarly, other embodiments include motors 12 with more than two sets of windings. To cancel or reduce the high-frequency torque ripple, motor control system 10 varies and adjusts the relative phases of the carrier signals for the voltage drive commands applied to the multiple sets of windings.

Figure 2:
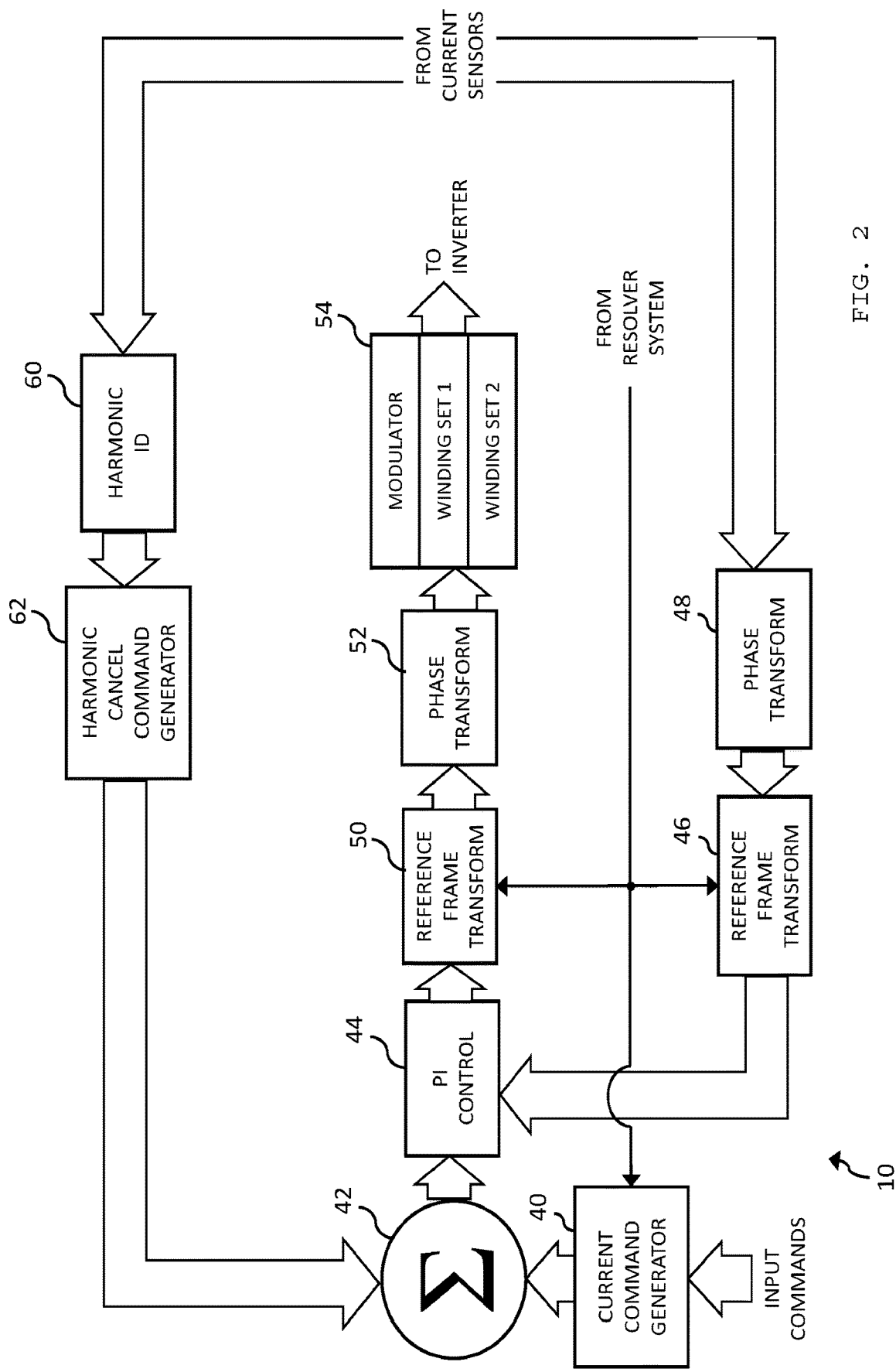
FIG. 2 is a diagrammatic illustration of a motor control system in accordance with embodiments.

FIG. 2 is a functional diagrammatic illustration of a motor control system 10 for a six-phase motor in accordance with embodiments. As shown, the input commands are applied to a current command generator 40. Current command generator 40 also receives motor feedback signals from the resolver system 20. In embodiments, the current command generator 40 alternatively or in addition receives other input information, such as signals characteristic of the power source 16 (e.g., the DC voltage provided by the power source). In response to the input commands and motor feedback signals, the current command generator 40 produces first and second sets of reference fundamental synchronous stator current commands $I_{dF1-ref}$, $I_{qF1-ref}$ and $I_{dF2-ref}$, $I_{qF2-ref}$. Each set of reference fundamental current commands is realized as two components relative to the d-q reference frame, and corresponds to one of the two sets of windings for the six-phase motor 12. In embodiments, the motor control system 10 produces the reference fundamental current commands $I_{dF1-ref}$, $I_{qF1-ref}$ and $I_{dF2-ref}$, $I_{qF2-ref}$ using FW and MTPA algorithms based on requested torque command T and the angular velocity ω of the motor 12, and optionally other operating parameters of the motor system 8. Current command generator 40 can operate in accordance with conventional or otherwise known motor control methods.

Summing junction 42 receives the reference fundamental current commands $I_{dF1-ref}$, $I_{qF1-ref}$ and $I_{dF2-ref}$, $I_{qF2-ref}$ produced by the current command generator 40. Also received by the summing junction 42 are first and second sets of harmonic cancellation commands $I_{d1n-ref}$-$I_{d1N-ref}$, $I_{q1n-ref}$-$I_{q1N-ref}$ and $I_{d2n-ref}$-$I_{d2N-ref}$, $I_{q2n-ref}$-$I_{q2N-ref}$. As described in greater detail below, the harmonic cancellation commands provide compensation for identified torque ripple in the motor 12. Each set may have zero, one, or more cancellation commands n, (0≤n≤N) where each cancellation command n corresponds to one identified harmonic subject to compensation. Each of the set of the cancellation commands is realized as two components relative to the d-q reference frame, and corresponds to one of the two sets of windings for the six-phase motor 12. Summing junction 42 superimposes the corresponding harmonic cancellation commands and the reference fundamental current commands to produce two sets of torque-ripple-compensated current reference signals $I_{dR1}$, $I_{qR1}$ and $I_{dR2}$, $I_{qR2}$. Each set of current reference signals corresponds to one of the two sets of windings for the six-phase motor, and is realized as two components relative to the d-q reference frame. The summing junction 42 can produce the current reference signals in accordance with conventional or otherwise known motor control methods.

PI (proportional-integral) controller 44 receives the current reference signals $I_{dR1}$, $I_{qR1}$ and $I_{dR2}$, $I_{qR2}$ produced by the summing junction 42. Also received by the PI controller 44 are two sets of synchronous frame quantity feedback signals $I_{d1-feed}$, $I_{q1-feed}$ and $I_{d2-feed}$, $I_{q2-feed}$ produced by reference frame transformation 46. The synchronous frame quantity feedback signals include information on the fundamental and harmonics frequencies of the drive signals on the motor 12. PI controller 44 processes the current reference signals and the synchronous frame quantity feedback signals to produce two sets of intermediate voltage commands $V_{d1}$, $V_{q1}$ and $V_{d2}$, $V_{q2}$. Each set of intermediate voltage commands corresponds to one of the two sets of windings for the six-phase motor 12. PI controller 44 can produce the intermediate voltage commands in accordance with conventional or otherwise known motor control methods.

Reference frame transform 46 receives two sets of alpha/beta current feedback signals $I_{α1-feed}$, $I_{β1-feed}$ and $I_{α2-feed}$, $I_{β2-feed}$, each of which corresponds to one of the two sets of windings for the six-phase motor 12, and produces the corresponding synchronous frame quantity feedback signals in accordance with conventional or otherwise known motor control methods. The two sets of alpha/beta current feedback signals are produced by the phase transform 48 from the sensed current feedback signals $I_{A-F}$ received from the current sensors 18 in accordance with conventional or otherwise known motor control methods.

Reference frame transform 50 receives the intermediate voltage commands $V_{d1}$, $V_{q1}$ and $V_{d2}$, $V_{q2}$ produced by the PI controller 44. Reference frame transform 50 also receives motor feedback signals such as the angular position θ of the motor shaft from the resolver system 20. Reference frame transform 50 processes the intermediate voltage commands and the motor feedback signals to produce two sets of stationary frame alpha/beta voltage commands $V_{α1}$, $V_{β1}$ and $V_{α2}$, $V_{β2}$. Each set of stationary frame alpha/beta voltage commands corresponds to one of the two sets of windings for the six-phase motor 12. Reference frame transform 50 can produce the stationary frame alpha/beta voltage commands in accordance with conventional or otherwise known motor control methods.

Phase transform 52 receives the alpha/beta voltage commands $V_{α1}$, $V_{β1}$ and $V_{α2}$, $V_{β2}$ produced by the reference frame transform 50 and produces the equivalent sets of three-phase voltage drive control signals $V_a$, $V_b$, $V_c$, and $V_d$, $V_e$, $V_f$ (i.e., $V_{a-f}$). The sets of voltage drive control signals are applied to modulator 54, which produces corresponding sets of PWM voltage drive commands $V_{A-F}$. Phase transform 52 can produce the voltage drive control signals in accordance with conventional or otherwise known motor control methods. With the exception of the high-frequency, multiple-winding-based torque ripple compensation functionality described below, modulator 54 can produce the voltage drive commands in accordance with conventional or otherwise known motor control methods. For example, the voltage drive control signals may be sinusoidal signals, and the modulator 54 may construct the PWM voltage drive commands from intersections of a sawtooth or triangle carrier signal with the voltage drive control signals.

The torque ripple compensation functionality of motor control system 10 may be provided by harmonic identification 60 and harmonic cancellation command generator 62, in combination with other features of the motor control system 10 including the summing junction 42 and modulator 54. In embodiments, the low-frequency torque compensation functionality is provided by harmonic identification 60 and harmonic cancellation command generator 62, which cooperate to produce harmonic cancellation commands that are applied to the summing junction 42. In embodiments, the high-frequency torque compensation functionality is provided by introducing a phase shift in the carrier signals for the multiple sets of windings based on the number of sets of windings (e.g., a six-phase motor has two sets of windings), and carrier signal type (e.g., triangle, sawtooth).

Harmonic identification 60 is coupled to receive the current feedback signals $I_{A-F}$ as shown in FIG. 2. Harmonic identification 60 processes the current feedback signals and identifies the fundamental-frequency harmonics present in the signals, as well as the magnitudes of the harmonics. The information provided by harmonic identification 60 is representative of harmonic frequencies and their magnitudes present in the drive currents in the motor 12. These harmonic frequencies may be undesirable and may contribute to torque ripple. In embodiments, the identified harmonics may include fundamental-frequency harmonics (e.g., from the motor operating frequency). Conventional or otherwise known signal processing methods, such as Fourier transformation and signal strength detection, can be performed by harmonic identification 60.

Harmonic cancellation command generator 62 receives the identified harmonics information (e.g., the harmonic frequencies and associated magnitudes), and identifies fundamental-frequency harmonics contributing to torque ripple that may be compensated for. Harmonic cancellation command generator 62 then generates harmonic cancellation commands that will provide compensation for the identified harmonics (e.g., minimize or reduce the torque ripple). The harmonic cancellation commands are applied to the summing junction 42.

In embodiments, harmonic cancellation command generator 62 may monitor the magnitudes of identified harmonics (e.g., harmonics 1-N) of the operating frequency of the motor 12, and identify for cancellation harmonics that have magnitudes greater than predetermined levels. For example, harmonic cancellation command generator may identify all harmonics having magnitudes greater than one level. In other embodiments, the predetermined levels can be different for different harmonics. The predetermined level or levels may be expected levels. The predetermined level or levels may be selected by an operator (e.g., at a range between 0% and 5% of an expected level.

After identifying the harmonics for compensation, they are transformed into direct and quadrature axis components (e.g. $I_{dn}$, $I_{qn}$). The harmonic cancellation command generator 62 produces for each harmonic n, sets of harmonic cancellation commands $I_{d1n-ref}$, $I_{q1n-ref}$ and $I_{d2n-ref}$, $I_{q2n-ref}$ that when superimposed with the fundamental synchronous stator current commands $I_{dF1-ref}$, $I_{qF1-ref}$ and $I_{dF2-ref}$, $I_{qF2-ref}$ at the summing junction 42, will result in the cancellation or minimization of the harmonic. Each set of harmonic cancellation commands corresponds to one of the sets of windings of the motor 12. As shown in FIG. 2, the harmonic cancellation commands are applied to the summing junction 42. The cancellation harmonics commands may be based on unwanted frequencies (e.g., other than fundamental signals) that may be removed or reduced from the electrical excitation to enhance system operation. For example, harmonics that are comparatively stronger in nature may detract from optimum operation of the system. In embodiments, the motor control system 10 may identify the harmonics that may detract from the operation of the motor 12 (e.g., harmonics that are relatively strong in nature). The control system 10 may then determine the level of those harmonics should be mitigated By way of example, the controller may determine that there are third and fifth harmonics that are 30% and 20% of the fundamental-frequency component, respectively. In this example, the control system 10 may, for example, be operated to define the allowable relative magnitudes to be 10% for the third harmonic and 0% for the fifth harmonic. The control system 10 may then generate the reference signals for the designated harmonics and closed-loop control can be implemented accordingly. Examples of motor performance parameters that can be monitored and compensated for (e.g., individually or simultaneously) include torque ripple, vibration and efficiency. Harmonics cancellation commands generated in accordance with embodiments may improve system performance. Thresholds such as those of the examples above may be made tighter for enhanced system performance.

In embodiments, modulator 54 compensates for high-frequency harmonics by producing phase shift between the carrier signals for the multiple winding sets. In the embodiment of the six-phase motor 12, for example, modulator 54 produces phase shift on the carrier signal for the first winding set with respect to the carrier signal for the second winding set. Modulator 54 controls the phase-shift angle of the carrier signals used for the multiple sets of windings based on the following formula $$\theta_{ps} = \frac{360°}{mn}$$

where m is the order of the dominant high-frequency torque ripple depending on the type of the carrier signal, and n is the number of winding sets. Since the dominant high-frequency torque ripple for sawtooth carrier signal is at the switching frequency, m=1 for sawtooth carrier signal. Since the dominant high-frequency torque ripple for triangle carrier signal is at twice of the switching frequency, m=2 for triangle carrier signal. For six-phase machines, there are two sets of windings, so n=2. For nine-phase machines, there are three sets of windings, so n=3. In embodiments of a six-phase machine, the phase shift for triangle and sawtooth carrier signals should be 90 and 180 degrees, respectively. In this case, the high-frequency harmonics generated by the two sets of windings can cancel each other.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in or associated with another embodiment. Motor control systems can include either or both of the low-frequency compensation approaches and the high-frequency compensation approaches described herein. The compensation approaches described herein can be incorporated into motors having fewer or greater numbers of phases. The scope of the invention should, therefore, be determined with reference to the appended claims, along with the full scope of equivalents to which such claims are entitled.

What is claimed is:

1. A method for operating a motor control system for a motor having multiple sets of windings, comprising:
   receiving an input command;
   receiving drive feedback signals representative of drive currents in a motor;
   identifying harmonics in the drive feedback signals representative of motor torque ripple;
   producing torque ripple compensation signals based on the identified harmonics; and producing motor drive control signals based on the input command, the current feedback signals and the torque ripple compensation signals, including:
  producing a set of motor drive signals for each of the multiple sets of windings; and
  controlling phase shift between carrier signals for the multiple sets of windings based on a number of the sets of windings and an order of a dominant high frequency torque ripple depending on a type of carrier signal.

2. The method of claim 1 wherein:
identifying the harmonics in the drive feedback signals includes identifying harmonics of the drive currents;
producing the torque ripple compensation signals includes producing harmonic cancellation commands; and
producing the motor drive control signals includes summing the harmonic cancellation commands and the input command.

3. The method of claim 2 wherein summing the harmonic cancellation commands and the input command includes summing the harmonic cancellation commands and the input command in the d-q reference frame.

4. The method of claim 3 wherein:
the method further comprises producing d-q reference frame control feedback signals based on the drive feedback signals; and
producing the motor drive control signals includes producing the motor drive signals based on the summed harmonic cancellation commands and the input command in the d-q reference frame and based on the d-q reference frame control feedback signals.

5. The method of claim 1, wherein:
producing the torque ripple compensation signals further includes determining carrier signal phase shift angle; and
producing the motor drive control signals further includes producing the motor drive control signals based on the carrier signals with the phase shift angle.

6. The method of claim 5, wherein producing the motor drive control signals includes:
producing the set of motor drive control signals for each of the multiple sets of windings based on a set of carrier signals; and
controlling the relative phase of the set of carrier signals based on the phase shift angle.

7. The method of claim 1, wherein producing the motor drive control signals includes:
producing the set of motor drive control signals for each of the multiple sets of windings based on a set of carrier signals; and
controlling the relative phase of the set of carrier signals.

8. The method of claim 1, wherein:
producing the torque ripple compensation signals includes determining carrier signal phase shift angle; and
producing the motor drive control signals includes:
  producing a set of motor drive control signals for each of the multiple sets of windings based on a set of carrier signals; and
  controlling the relative phase of the set of carrier signals.

9. The method of claim 1 wherein producing the torque ripple compensation signals includes producing the torque ripple compensation signals based on magnitudes of the identified harmonics.

10. The method of claim 1 wherein producing the torque ripple compensation signals includes producing the torque ripple compensation signals if the magnitudes of the identified harmonics are greater than predetermined levels.

11. The method of claim 1 wherein:
the method further comprises receiving motor operating characteristic feedback signals; and
producing the motor drive control signals further includes producing the motor drive control signals based on the motor operating characteristic feedback signals.

12. The method of claim 1 wherein the input command includes a torque command.

13. A motor control system for a motor having multiple sets of windings, comprising:
one or more processors; and
a program memory coupled to the one or more processors and storing executable instructions that when executed by the processors cause the computer system to:
  receive an input command;
  receive drive feedback signals representative of drive currents in a motor;
  identify harmonics in the drive feedback signals representative of motor torque ripple;
  produce torque ripple compensation signals based on the identified harmonics; and
  produce motor drive control signals based on the input command, the current feedback signals and the torque ripple compensation signals, including:
    producing a set of motor drive signals for each of the multiple sets of windings; and
    controlling phase shift between carrier signals for the multiple sets of windings based on a number of the sets of windings and an order of a dominant high frequency torque ripple depending on a type of the carrier signal.

14. The motor control system of claim 13 wherein:
identifying the harmonics in the drive feedback signals includes identifying harmonics of the drive currents;
producing the torque ripple compensation signals includes producing harmonic cancellation commands; and
producing the motor drive control signals includes summing the harmonic cancellation commands and the input command.

15. The motor control system of claim 14 wherein summing the harmonic cancellation commands and the input command includes summing the harmonic cancellation commands and the input command in the d-q reference frame.

16. The motor control system of claim 15, wherein:
producing the torque ripple compensation signals includes determining carrier signal phase shift angle; and
producing the motor drive control signals includes:
  producing a set of motor drive control signals for each of the multiple sets of windings based on a set of carrier signals; and
  controlling the relative phase of the set of carrier signals.

* * * * *